United States Patent [19]

McCombie

[11] Patent Number: 5,361,629
[45] Date of Patent: Nov. 8, 1994

[54] SINGLE SENSOR MISFIRE DETECTION APPARATUS AND METHOD FOR AN INTERNAL COMBUSTION ENGINE

[75] Inventor: Jay C. McCombie, Rochester Hills, Mich.

[73] Assignee: Chrysler Corporation, Highland Park, Mich.

[21] Appl. No.: 934,057

[22] Filed: Aug. 21, 1992

[51] Int. Cl.⁵ .................. G01M 15/00; F02M 51/00; F02P 5/145
[52] U.S. Cl. .................. 73/117.3; 123/419; 364/431.07
[58] Field of Search .............. 73/116, 117.3; 123/419; 364/431.07

[56] References Cited

U.S. PATENT DOCUMENTS

| | | | |
|---|---|---|---|
| 4,179,922 | 12/1979 | Bouverie et al. | 73/116 |
| 4,295,363 | 10/1981 | Buck et al. | 73/117.3 |
| 4,337,647 | 7/1982 | Radcliffe et al. | 73/116 |
| 4,461,257 | 7/1984 | Hosaka et al. | 123/419 |
| 4,532,592 | 6/1985 | Citron et al. | 364/431.05 |
| 4,562,818 | 1/1986 | Kohama et al. | 123/478 |
| 4,606,224 | 8/1986 | Tedeschi et al. | 73/117.3 |
| 4,782,692 | 11/1988 | Peden et al. | 73/117.3 |
| 4,930,479 | 6/1990 | Osawa et al. | 123/436 |
| 4,932,379 | 6/1990 | Tang et al. | 73/117.3 |
| 4,936,277 | 6/1990 | Deutsch et al. | 123/436 |
| 4,941,445 | 7/1990 | Deutsch | 123/414 |
| 4,976,241 | 12/1990 | Ishida et al. | 123/425 |
| 5,021,960 | 6/1991 | Manaka et al. | 364/431.01 |
| 5,040,412 | 8/1991 | Wannenwetsch | 364/431.07 X |
| 5,088,318 | 2/1992 | Osawa | 73/117.3 |
| 5,237,862 | 8/1993 | Mangrulkar et al. | 73/116 |

FOREIGN PATENT DOCUMENTS

0442687  8/1991  European Pat. Off.

Primary Examiner—Tom Noland
Assistant Examiner—George M. Dombroske
Attorney, Agent, or Firm—Mark P. Calcaterra

[57] ABSTRACT

A misfire detection apparatus and method is provided for detecting misfire in cylinders of an internal combustion engine in a motor vehicle. The method includes sensing rotation of a crankshaft and calculating a crankshaft velocity based on the sensed rotation of the crankshaft. The method also includes compensating the calculated crankshaft velocity based on a predetermined cylinder. The method further includes comparing either the calculated or compensated crankshaft velocity to a predetermined crankshaft velocity range to determine if therein, and counting a misfire if either the calculated or compensated crankshaft velocity is within the predetermined crankshaft range.

17 Claims, 8 Drawing Sheets

SINGLE SENSOR MISFIRE DETECTION APPARATUS AND METHOD FOR AN INTERNAL COMBUSTION ENGINE

BACKGROUND OF THE INVENTION

1. Field of the Invention

The present invention relates generally to internal combustion engines, and more particularly, to a misfire detection apparatus and method for an internal combustion engine.

2. Description of the Related Art

The Clean Air Act (1955) required motor vehicle manufacturers to reduce exhaust emissions of carbon monoxide, hydrocarbons, and oxides of nitrogen from light duty motor vehicles. To comply with the Act, most motor vehicle manufacturers have used catalytic convertors on production vehicles to control such exhaust emissions.

Recently, regulatory agencies have proposed that passenger, light-duty and medium-duty motor vehicles with feedback fuel control systems be equipped with a malfunction indicator light that will inform the motor vehicle operator of any malfunction of an emission-related component that interfaces with an on-board computer of the motor vehicle. It is also proposed or required that an on-board diagnostic system identify the likely area of malfunction. Proposals or requirements have set forth catalyst, misfire, evaporative purge system, secondary air system, air conditioning system refrigerant, fuel system, oxygen sensor, exhaust gas recirculation, and comprehensive component monitoring requirements.

Misfire of internal combustion engines can damage the catalyst of a catalytic convertor. With respect to misfire, the identification of the specific cylinder experiencing misfire may be required. Some regulations provide that the motor vehicle manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a durability demonstration motor vehicle to fail a Federal Test Procedure (FTP) by more than 150% of the applicable standard if the degree of misfire were present from the beginning of the test; and (3) the degree of misfire evaluated in a certain number of revolution increments which would cause a durability demonstration motor vehicle to fail an Inspection and Maintenance (IM) program tailpipe exhaust emission test.

SUMMARY OF THE INVENTION

It is, therefore, one object of the present invention to provide an apparatus and method of misfire detection for an internal combustion engine.

It is another object of the present invention to use a single sensor for misfire detection.

It is yet another object of the present invention to provide a method of misfire detection which compensates for errors in the crankshaft velocity.

It is still another object of the present invention to provide a method of misfire detection which improves the accuracy of cylinder to cylinder relative velocity measurement.

To achieve the foregoing objects, the present invention is an apparatus and method for detecting misfire in cylinders of an internal combustion engine in a motor vehicle. The method includes sensing rotation of a crankshaft and calculating a crankshaft velocity based on the sensed rotation of the crankshaft. The method also includes compensating the calculated crankshaft velocity based on a predetermined cylinder. The method further includes comparing either the calculated or compensated crankshaft velocity to a predetermined crankshaft velocity range to determine if therein, and counting a misfire if either the calculated or compensated crankshaft velocity is within the predetermined range.

One advantage of the present invention is that an apparatus and method of misfire detection is provided for an internal combustion engine. Another advantage of the present invention is that one or a single sensor is used to measure the velocity of the crankshaft. Yet another advantage of the present invention is that a compensation routine is used to eliminate crankshaft wheel machining tolerance errors in the period measurement. Still another advantage of the present invention is that an adaptive RPM compensation routine is provided to improve the accuracy of cylinder to cylinder relative velocity measurement.

Other objects, features and advantages of the present invention will be readily appreciated as the same becomes better understood after reading the following description taken in conjunction with the accompanying drawings.

BRIEF DESCRIPTION OF THE DRAWINGS

FIG. 2 is a pictorial diagram illustrating a crankshaft and camshaft in communication with the misfire detection apparatus of FIG. 1.

DESCRIPTION OF THE PREFERRED EMBODIMENT(S)

Figure 1:
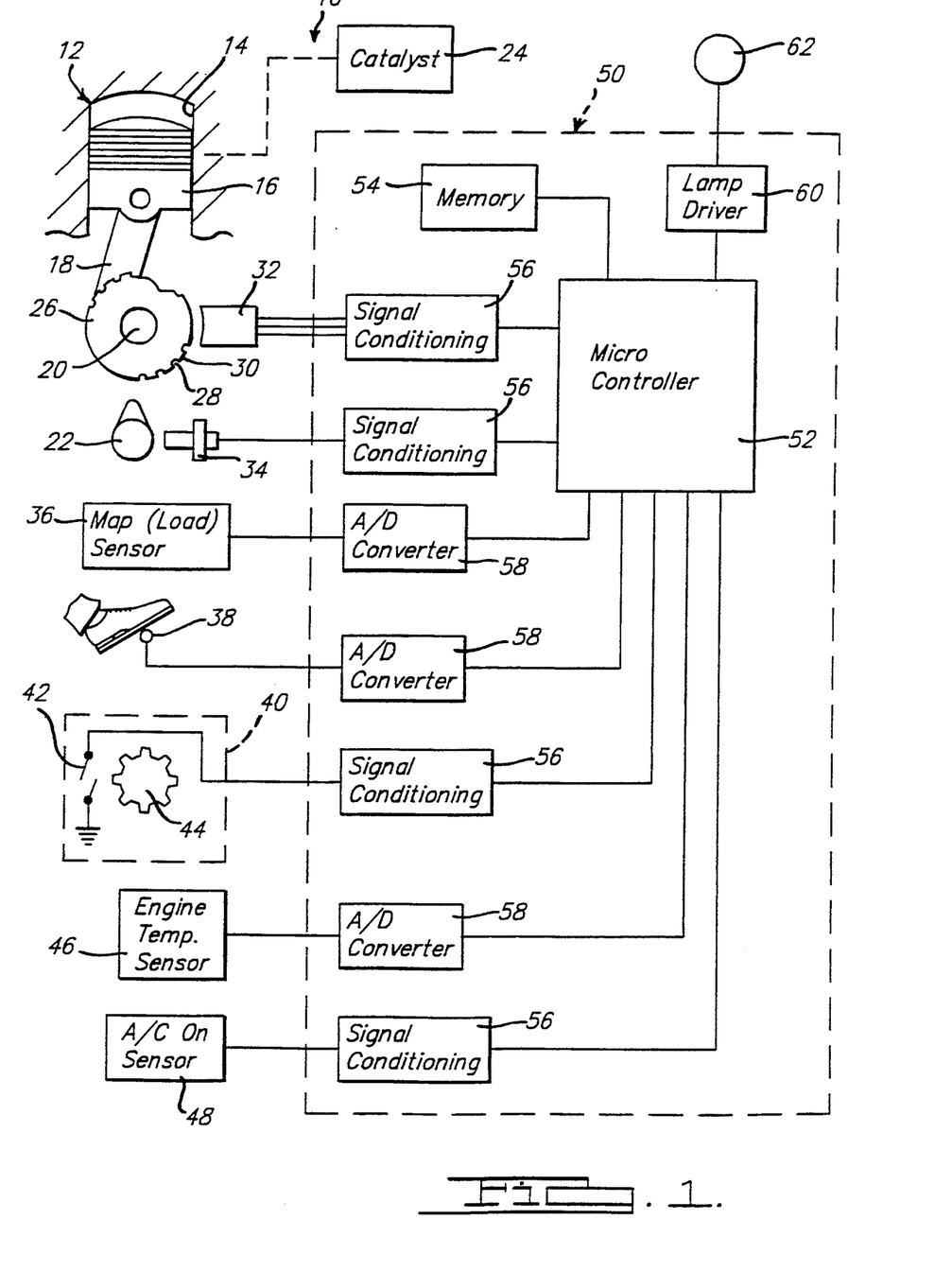
FIG. 1 is an overall block diagram illustrating the misfire detection apparatus according to the present invention.

Referring to FIG. 1, an overall block diagram illustrating the misfire detection apparatus 10 according to the present invention is shown. The apparatus 10 is used on an internal combustion engine, generally indicated at 12, of a motor vehicle (not shown). The engine is partially shown in a cut-away view, illustrating one of a multiple of cylinders 14 in the engine 12. As illustrated, a piston is disposed in the cylinder 14. The piston 16 is operatively connected by a connecting rod 18 to a crankshaft 20. A camshaft 22 is used to open and close at least one valve (not shown) of the cylinder 14 for various strokes of the piston 16. The piston 16 is illustrated in the expansion (power) stroke of a four stroke engine. In such a four stroke engine, the strokes include intake, compression, expansion (power), and exhaust. During the exhaust stroke, exhaust gases flow from the cylinder 14 via at least one valve and through the exhaust system (not shown). A catalyst 24 of a catalytic converter (not shown) is illustrated pictorially as part of the exhaust system. Although in the preferred embodiment the apparatus 10 is applied to a four stroke engine, the apparatus 10 can also be applied to other internal combustion engines, such as a two stroke engine. In addition, the apparatus 10 can be applied to any spark-ignited or diesel engine. It should be appreciated that a spark plug is present in the preferred embodiment, although it is not illustrated.

The apparatus 10 includes a sensor target 26 operatively connected to the crankshaft 20. The sensor target 26 has at least one, preferably a plurality of trip points, which in the preferred embodiment are slots 28, formed by teeth 30, the purpose of which are more fully described below. The apparatus 10 also includes a crankshaft sensor 32 in communication with the sensor target 26 and a camshaft sensor 34 in communication with the camshaft 22, both sensors of which will also be more fully described below. The apparatus 10 further includes a Manifold Absolute Pressure (MAP) or load sensor 36, throttle position sensor 38, and a vehicle speed sensor 40. The vehicle speed sensor 40 may include a reed switch 42 and wheel 44, which is a gear in the vehicle's transmission (not shown). Preferably, the vehicle speed sensor 40 is a Hall effect sensor although any other suitable sensor may be used. The apparatus 10 includes an engine temperature sensor 46 and air conditioner (A/C) on/off sensor 48. The outputs of the sensors 32, 34, 36, 38, 40, 46 and 48 communicate with an engine control unit, generally indicated at 50.

The engine control unit 50 includes a micro controller 52, memory 54, signal conditioning 56, and Analog to Digital (A/D) converters 58 to take signals from the various sensors described above and process them according to the misfire detection methodology described below. In the preferred embodiment, the output of the crankshaft sensor 32, camshaft sensor 34, vehicle speed sensor 40 and A/C on/off sensor 48 communicates with the micro controller 52, via appropriate signal conditioning 56, which is particularized to the type of sensor used. The output of the MAP sensor 36, throttle position sensor 38 and engine temperature sensor 46 communicates with the micro controller 52, via the A/D converters 58. The engine control unit 50 also includes a lamp driver 60, which takes the output of the micro controller 52 and drives an output display such as an indicator light or driver warning lamp 62. It should be appreciated that memory 54 refers to a generic memory and may comprise Random Access Memory (RAM), Read Only Memory (ROM), or another type as appropriate. It should also be appreciated that the engine control unit 50 includes timers, counters and like components for the misfire detection methodology to be described.

Referring to FIG. 2, a pictorial diagram illustrating the crankshaft 20, camshaft 22, sensor target 26, crankshaft sensor 32 and crankshaft sensor 34 in communication with the engine control unit 50, which contains the misfire detection methodology, more fully described below. In the preferred embodiment, the sensor target 26 is formed by slots 28 which are cut into a flange 63. The flange 63 is attached to or incorporated on a pulley or wheel (not shown) such as by welding, although any means that will securely fasten the flange 63 to the wheel will suffice. The wheel is affixed to and driven by the crankshaft 20.

In the preferred embodiment, the engine 12 has four cylinders 14 oriented into a straight line configuration, resulting in a one hundred eighty degree (180°) expansion stroke for each cylinder 14. Preferably, the firing order of the cylinders 14 is 1342. The crankshaft velocity measurement is taken for a sixty degree (60°) interval of the expansion stroke for each cylinder 14 of the engine 12. Preferably, the sixty degree (60°) interval is near the end of the expansion stroke. As illustrated in FIG. 2, a signature slot 64 is cut into the flange 63 such that a first edge 65 is a sixty-nine degree (69°) edge. At least one slot 28 is cut in the flange 63 after the first edge 65 to form a second edge 66 as a nine degree (9°) edge. Optionally, other slots 28 may be cut in the flange 63 between the first and second 65 and 66 and may be used for ignition timing. It should be appreciated that the first edge 65 identifies cylinder number 1 and 4 of the cylinders 14.

The sensor target 26 includes at least two other slots 28 to form a third edge 67 and fourth edge 68 opposite or one hundred eighty degrees (180°) from the first edge 65 and second edge 66, respectively. Optionally, other slots 28 may be cut in the flange 63 between the third and fourth edges 67 and 68 and may be used for ignition timing. It should be appreciated that the third edge 67 identifies cylinder number 3 and 2 of the cylinders 14. It should also be appreciated that the third edge 67 is a sixty-nine degree (69°) edge and the fourth edge 58 is a nine degree (9°) edge.

The crankshaft sensor 32 is used to measure crankshaft velocity. The crankshaft sensor 32 is located at top dead center (TDC) position relative to the crankshaft centerline and mounted near the sensor target 26. In the preferred embodiment, the crankshaft sensor 32 is a Hall effect sensor. It should be appreciated that other sensors such as optical sensors or variable reluctance sensors may also be used in alternative embodiments of the invention.

The camshaft sensor 34 is used to identify specific cylinder firing. Such identification will assist in pinpointing exactly what cylinder or cylinders are misfiring, as more fully set forth below. Although the preferred embodiment uses a stock distributor and algorithm to determine Top Dead Center (TDC) of the Number One cylinder, cylinder identification techniques will vary with different engines. It should be appreciated that the camshaft sensor 34 and camshaft 25 are conventional and known in the art.

Figure 3:
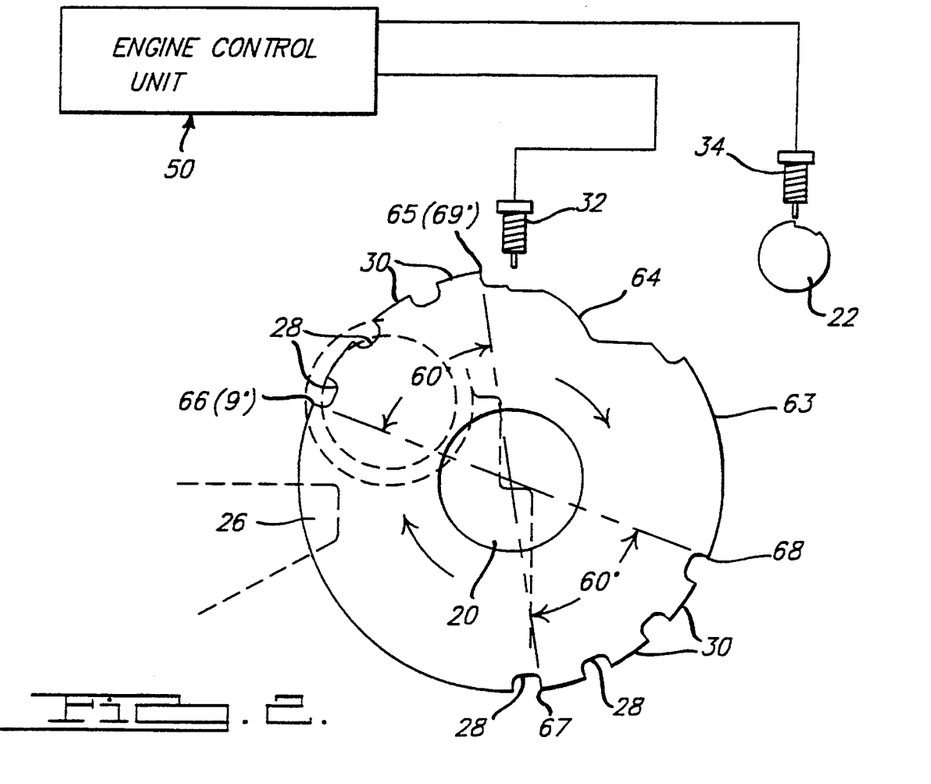
FIG. 3 is a flowchart illustrating the overall method for misfire detection of the apparatus of FIG. 1.

Referring to FIG. 3, a flowchart illustrating the overall method for misfire detection of the engine 12 is shown. The methodology begins with block 70, in which a timer is started by the micro controller 52 when the crankshaft sensor 32 detects the first edge 65 or third edge 67 for the sixty nine degree (69°) edge of a tooth 30 located on the sensor target 26. Next, the methodology advances to block 72 in which the timer is stopped by the micro controller 52 when the crankshaft sensor 32 detects the second edge 66 or fourth edge 68 for the nine degree (9°) edge of another tooth 30 located on the sensor target 26. The methodology then advances to block 74. It should be appreciated that the sixty degree (60°) interval is measured during a piston expansion stroke within a known cylinder 14.

In block 74, the time interval on the timer which was measured in blocks 70 and 72 and the sixty degree (60°) interval between the tooth edges are used by the micro controller 52 to calculate an angular velocity (RPM) value of the sensor target 26, and therefore the crankshaft 20, by a subroutine IC1 to be described. The result is stored by the micro controller 52 in the memory 54. Next, the methodology advances to block 76 and subtracts the calculated angular velocity (RPM) for the known cylinder 14 from a previous calculated angular velocity (RPM) for the preceding cylinder 14 which is one hundred eighty degrees (180°) from the known cylinder 14 to obtain a result. The methodology advances to diamond 78 and micro controller 52 determines whether the result in block 76 is a negative value. If so, the methodology advances to block 80 and the micro controller 52 concludes that no misfire has occurred. The methodology then advances to bubble 82 and returns.

In diamond 78, if the result is not a negative value, the methodology advances to diamond 84 and determines whether the result is greater than a predetermined value such as sixty-four (64) RPM. If so, the methodology advances to block 86 and concludes that a misfire has occurred. If not, the methodology advances to diamond 88 and determines whether the result is less than a referenced or stored profile called DROPTAB and illustrated in FIG. 4. DROPTAB is a profile of a difference in speed (RPM) between cylinders versus current engine speed (RPM).

If the result is less than DROPTAB, the methodology advances to block 80 previously described and concludes that no misfire has occurred. If not, the methodology advances to block 86 previously described and concludes that a misfire has occurred. The methodology then advances to block 90 and increments a counter in the micro controller 52. The methodology then advances to bubble 82 and returns.

Figure 5:
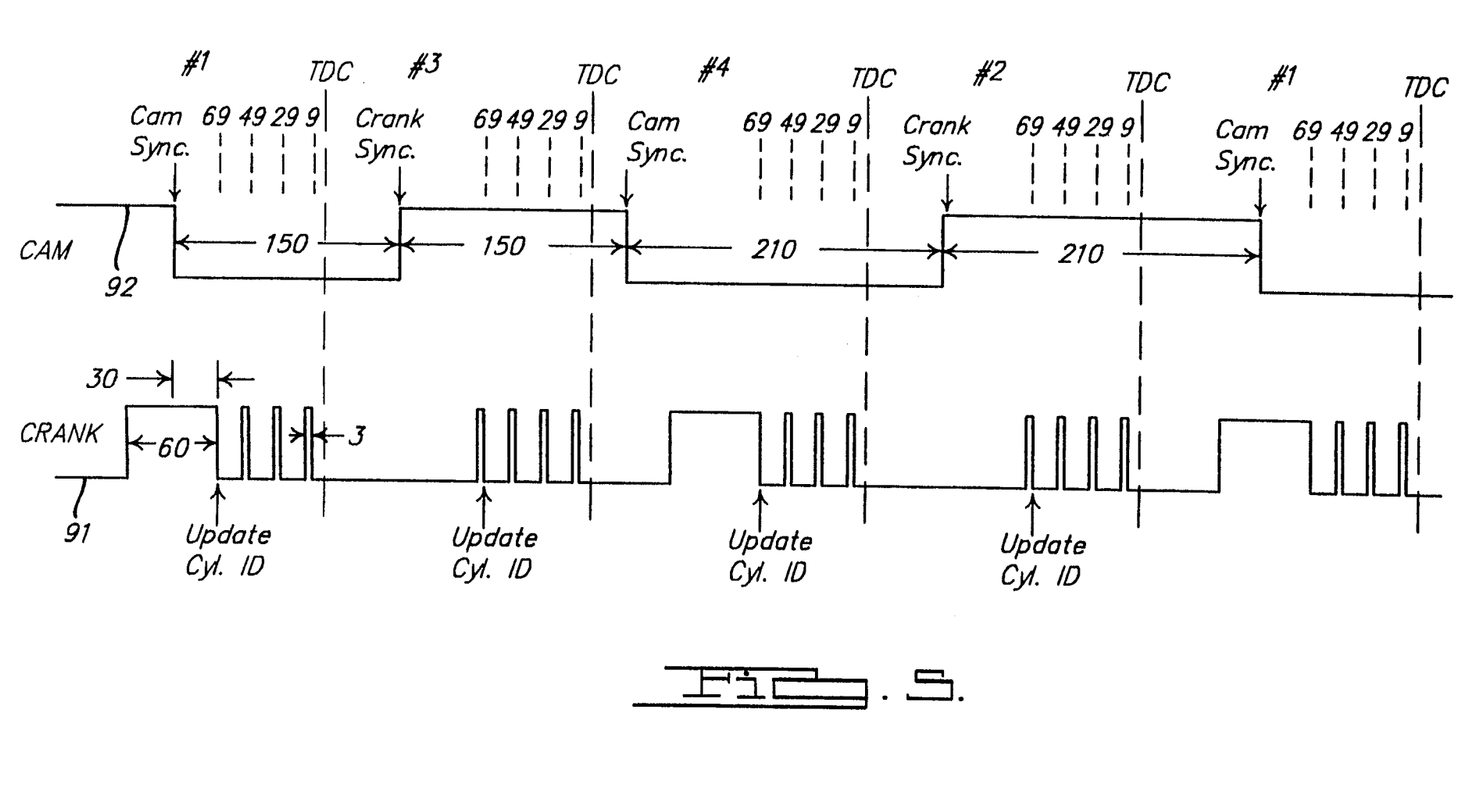
FIG. 5 illustrates sensor waveforms for the misfire detection method of FIG. 3.

When a misfire event is detected, the cylinder 14 is identified by the camshaft sensor 34, as described in conjunction with FIG. 5, and a cylinder unique misfire counter (not shown) in the micro controller 52 for that particular cylinder 14 is incremented. After a predetermined number of engine revolutions, the cylinder unique misfire counters are evaluated by the micro controller 52 to determine whether the rate of misfire could cause premature failure of the catalyst 24. If one cylinder unique misfire counter indicates failure, the cylinder number or identification is recorded by the micro controller 52 and the driver warning lamp 62 is illuminated by the lamp driver 60. If no specific cylinder can be identified as the cause of misfire, the driver warning lamp 62 is nevertheless illuminated, and a general misfire condition is recorded by the micro controller 52.

Referring to FIG. 5, sensor waveforms for the misfire detection methodology are illustrated. Waveforms CRANK 91 and CAM 92 illustrate signals generated from crankshaft sensor 32 and camshaft sensor 34, respectively. The signals from these sensor 32 and 34 are used to identify cylinder numbers. Accordingly, a negative edge of a high state from the camshaft sensor 34 occurs during a high state from the crankshaft sensor 32 corresponding to the signature slot 64, which indicates cylinder number 1 of the engine 12. A negative edge of a high state from the camshaft sensor 34 occurs during a low state from the crankshaft sensor 32, which indicates cylinder number 4 of the engine 12. This arrangement forces the micro controller 52 to accept the identification of cylinder numbers 1 and 4 during predetermined time periods.

Figures 6, 7:
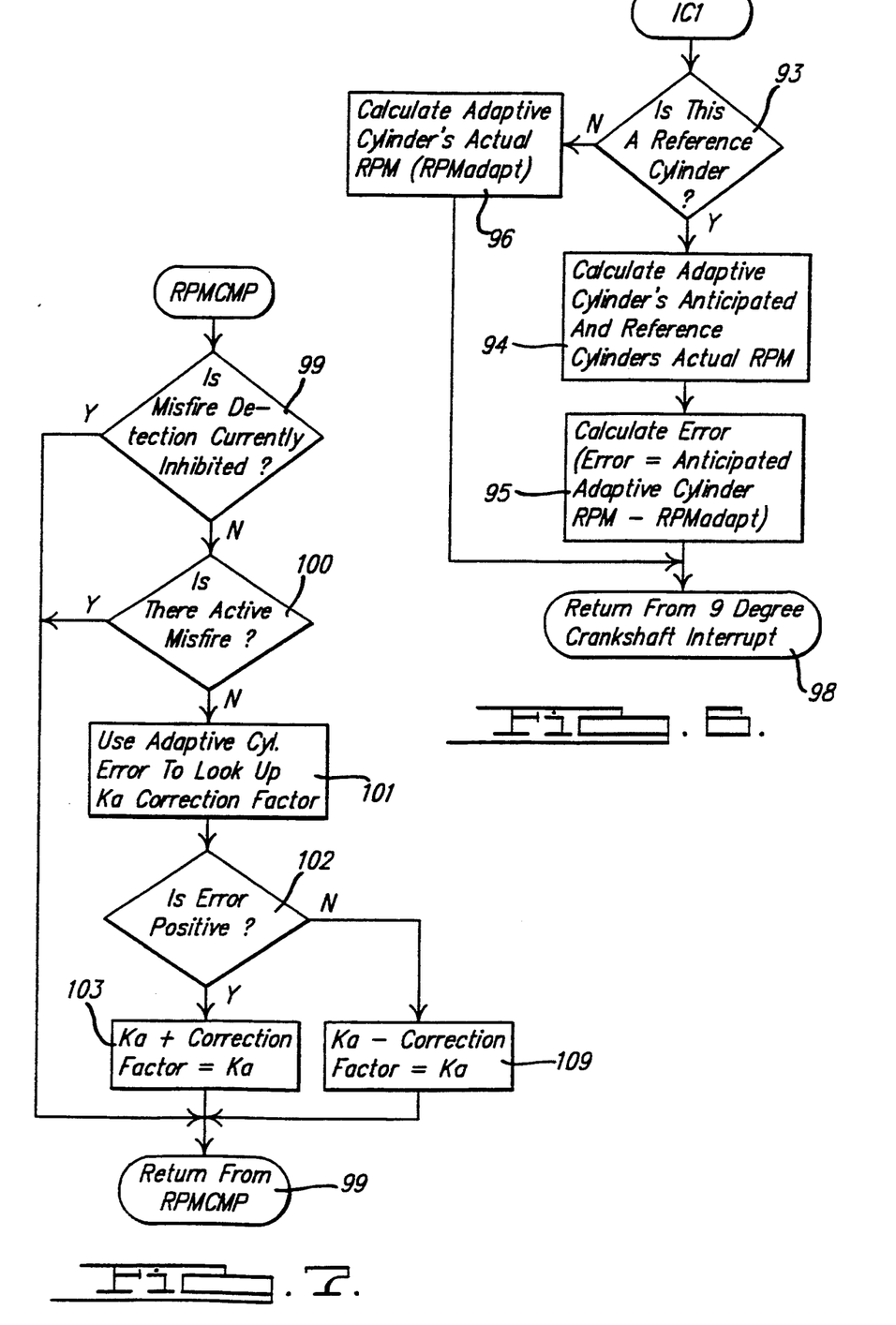
FIG. 6 is a flowchart illustrating a portion of the misfire detection method of FIG. 3.
FIG. 7 is a flowchart illustrating a portion of the misfire detection method of FIG. 3.

Referring to FIG. 6, the methodology for the subroutine IC1 of block 74 of FIG. 3 is shown. IC1 is used to calculate the velocity of cylinders 1 through 4 using the timer interval from the 69° edge to the 9° edge obtained in blocks 70 and 72. IC1 also calculates the velocity calculation error of the adaptive cylinder pair (e.g., cylinders 2 and 4 for a four cylinder engine) with respect to the reference cylinder pair (e.g., cylinders 1 and 3 for a four cylinder engine). The methodology begins in diamond 93 and determines if the current cylinder 14 is an adaptive or reference cylinder. This is accomplished by a signal from the cam sensor 34. If the current cylinder 14 is a reference cylinder, the methodology advances to block 94 and calculates the reference cylinder pair crankshaft velocity($RPM_{ref}$) in accordance with the following formula:

$$RPM_{adapt} = K/_a C_c$$

$$RPM_{ref} = K/_r C_c$$

$K_a$ = Adaptive numerator $K_r$ = Reference numerator $C_c$ = number of timer cycles The methodology advances to block 95 and calculates an anticipated adaptive cylinder velocity by summing the current reference cylinder pair velocity and the 360° old reference velocity and then dividing by 2. This anticipated adaptive cylinder velocity should, for four cylinder engines, be equal to the adaptive cylinder velocity($RPM_{adapt}$) on the average. The methodology also calculates a difference with the adaptive cylinder's last calculated velocity ($RPM_{adapt}$) and the average reference velocity, thus forming the error term in block 95. The error term will be used by the RPMCMP subroutine in FIG. 7 to modify the numerator ($K_a$) in the adaptive cylinder pair's velocity equation.

In diamond 93, if the current cylinder 14 is not a reference cylinder, the methodology proceeds to block 96 and calculates the adaptive cylinder velocity ($RPM_{adapt}$) according to the above-described formula. From blocks 95 and 96, the methodology advances to bubble 97 where the interrupt routine is completed and the methodology returns. It should be appreciated that the error term calculated in block 95 is an indication of the spacing difference of the 69° edge to 9° edge for the adaptive cylinder pair relative to the reference cylinder pair. It should also be appreciated that the $K_a$ term is modified in the subroutine RPMCMP.

Beginning with diamond 98 of FIG. 7, the methodology determines if misfire detection is currently inhibited for any reason. If misfire detection is currently inhibited, the methodology advances to bubble 99 and no modification to the $K_a$ term is made and the subroutine terminates or returns. If misfire detection is not currently inhibited, the methodology advances to diamond 100 and determines whether there is active misfire. If active misfire is present, the methodology advances to bubble 99 previously described and no modification to the $K_a$ term is made. If there is no active misfire present, the methodology advances to block 101 and uses the error term from block 95 to look up a correction factor(CORRECT). The methodology then advances to diamond 102 and determines if the error term from block 95 is positive. If positive, the methodology advances to block 103 and this factor is added to the $K_a$ term. If the error term is not positive, the methodology advances to block 104 and this factor is subtracted from the $K_a$ term. From blocks 103 and 104, the methodology advances to bubble 99 and the error term is then cleared and the subroutine returns. It should be appreciated that this process normalizes the crankshaft velocity waveform with respect to the reference cylinder pair.

Figure 8A:
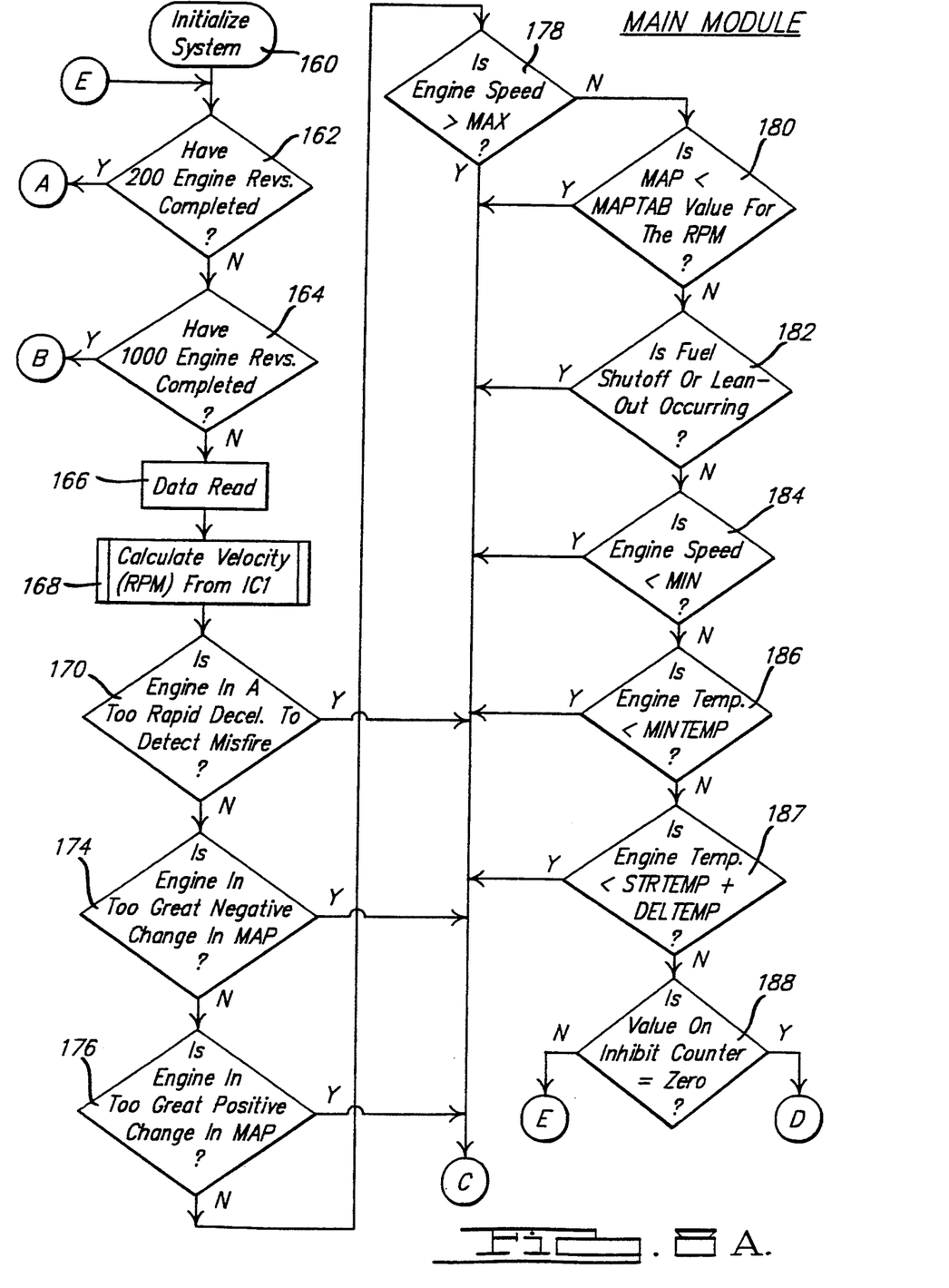
FIGS. 8A–8C are flowcharts illustrating the method for misfire detection of the apparatus of FIG. 1.

Referring now to FIG. 8A, the methodology is started at bubble 160 and initializes the apparatus 10 by setting all misfire counters to zero and, if first initialization since battery disconnect, loads $K_a$ with an initial or predetermined value. The methodology falls through to diamond 162 to determine whether a predetermined number of engine revolutions such as two hundred (200) have been completed, for example by looking for a flag. If two hundred engine revolutions have been completed, the methodology branches to block 250, which will be described in further detail in conjunction with FIG. 8C.

Returning now to diamond 162, if two hundred (200) engine revolutions have not been completed, the methodology falls through to diamond 164 to see whether a second predetermined number of engine revolutions such as one thousand (1000) have been completed, for example by looking for a flag. If so, the methodology branches to block 300, which will be described in further detail in conjunction with FIG. 8C. If one thousand (1000) engine revolutions have not been completed, the methodology falls through to block 166, to read data from sensors 32 and 34. The methodology then advances to block 168 to calculate an angular velocity (RPM) from IC1 previously described in FIG. 6. The methodology then advances to diamond 170.

In diamond 170, the methodology checks to see if the engine is in a deceleration that would be too rapid to detect misfire, for example by looking at a change in crankshaft velocity over a one hundred eighty degree (180°) period. The micro controller 52 compares the speed detected by sensor 40 to see if greater than a predetermined value such as eighty (80) RPM over a period of seven hundred twenty degrees (720°). If so, the methodology branches to block 172 to inhibit misfire detection for a predetermined count of seven hundred twenty degree (720°) periods. This prevents the misfire detection apparatus 10 from determining misfire while the monitor inhibit flag is set.

If the engine is not in too rapid a deceleration to detect misfire in diamond 170, the methodology advances to diamond 174 to determine if there is too great a negative change in MAP. The micro controller 52 compares the MAP detected by sensor 36 to see if greater than a predetermined value every one hundred eighty degrees (180°). If so, the methodology advances to block 172 previously described. If not, the methodology advances to diamond 176 to determine if there is too great a positive change in MAP similar to diamond 174. If so, the methodology advances to block 172 previously described. If not, the methodology advances to diamond 178 to determine if the engine speed exceeds a predetermined maximum level. The micro controller 52 compares the speed detected by sensor 40 to see if greater than a predetermined value every one hundred eighty degrees (180°). If the engine speed does exceed this predetermined maximum level, then the methodology advances to block 172 previously described.

If the engine speed does not exceed the predetermined maximum level as described in diamond 178, the methodology advances to diamond 180 to see if the current MAP value detected by sensor 36 is less than a stored MAP value corresponding to the current engine speed. If the MAP value is less than the stored MAP value, the methodology advances to diamond 172 previously described. The current MAP value is tested every one hundred eighty degrees (180°). If not, the methodology advances to diamond 182 to determine whether there is fuel shutoff or leanout occurring, for example by looking for a flag. If so, the methodology advances to block 172 previously described. If not, the methodology advances to diamond 184 to determine if the current engine speed detected by sensor 40 is less than a predetermined minimum value or level. If so, the methodology advances to block 172 previously described. If not, the methodology advances to diamond 186 to determine if the engine temperature detected by sensor 46 is less than a predetermined minimum level or value. If so, the methodology advances to block 172 previously described. If not, the methodology advances to diamond 187 to determine if the engine temperature is less than a predetermined start temperature plus an engine coolant temperature increase required to enable misfire detection such as three degrees. If not, the methodology advances to block 172 previously described. If so, the methodology advances to diamond 188 and determines whether the value on the inhibit counter is equal to zero. If not, the methodology advances to diamond 162 previously described.

Figure 8B:
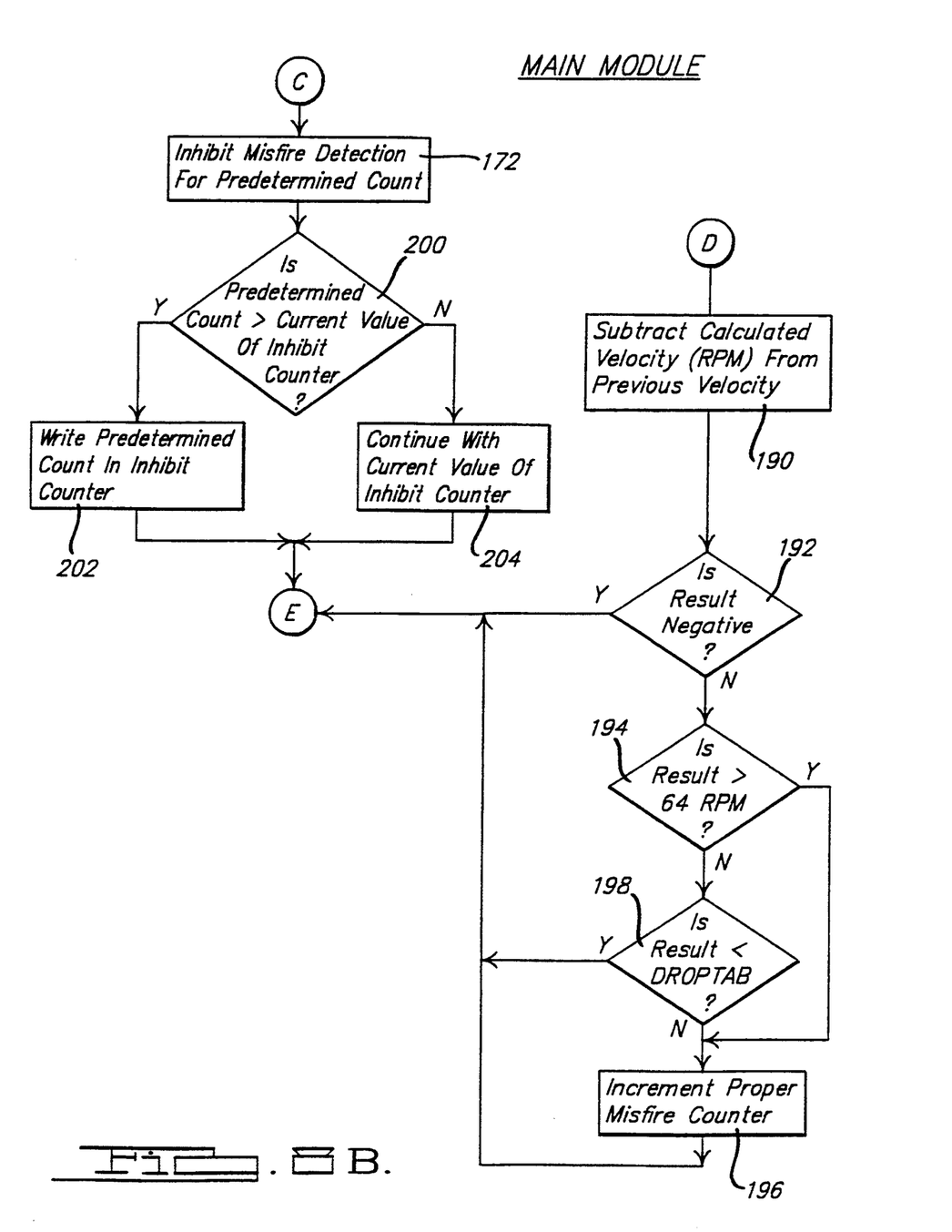

If the value on the inhibit counter is equal to zero, the methodology advances to block 190 (FIG. 6B) and subtracts the current calculated angular velocity (RPM) of block 168 from a previous calculated velocity (RPM) for the preceding three hundred sixty degree (360°) cylinder (e.g. cylinder no. 4 minus cylinder no. 1). The methodology then advances to diamond 192 and determines whether the value or result of block 190 is negative. If so, the methodology advances to diamond 162 previously described. If not, the methodology advances to diamond 194 and determines if the result is greater than a predetermined value such as sixty-four (64) RPM. If so, the methodology advances to block 196 to increment the proper misfire counter. The methodology then advances to diamond 162 previously described.

Figure 4:
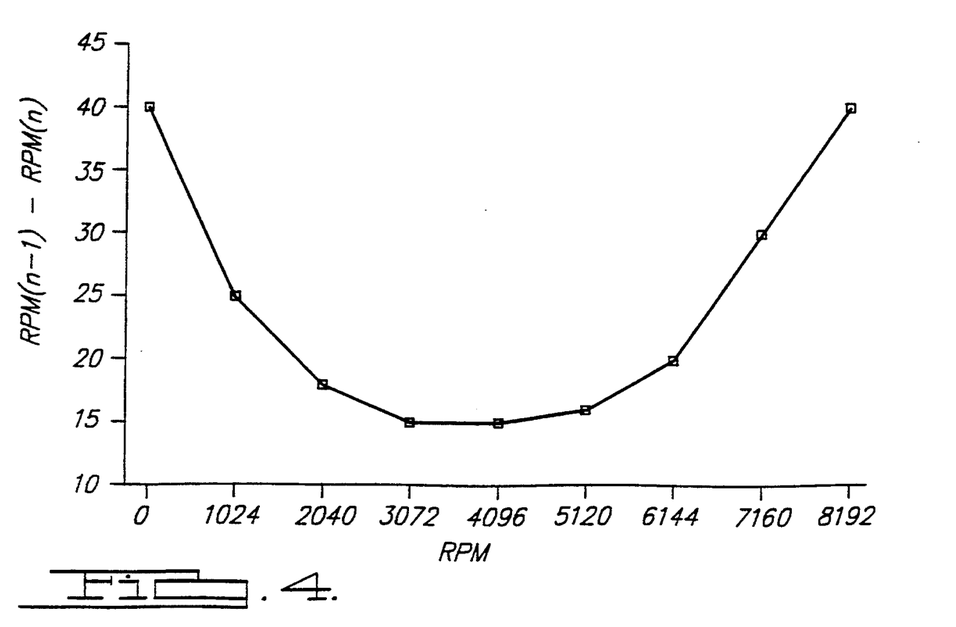
FIG. 4 illustrates a profile of DROPTAB used in connection with the misfire detection method of FIG. 3.

If the result is not greater than sixty-four (64) RPM, the methodology advances to diamond 198 and determines whether the result is less than a stored value corresponding to the current engine speed in DROP-TAB as illustrated in FIG. 4. If so, the methodology advances to diamond 162 previously described. If not, the methodology advances to block 196 previously described.

Returning to block 172, the methodology inhibits misfire detection for a predetermined count on an inhibit counter (not shown) in the micro controller 52. From block 172, the methodology advances to diamond 200 and determines if the current value on the inhibit counter is less than a predetermined count, such as twenty (20). If so, the methodology advances to block 202 and writes the predetermined count in the inhibit counter. If not, the methodology advances to block 204 and continues with the current value of inhibit counter. From blocks 202 and 204, the methodology advances to diamond 162 previously described.

Referring now to FIG. 6B, block 250 of FIG. 6B continues from block 200 of FIG. 6A. In block 250, the methodology clears the RV 200 service flag to indicate that two hundred (200) engine revolutions have been completed. Next, the methodology advances to diamond 252 and determines whether a predetermined number such as one thousand (1000) engine revolutions have occurred or been completed, for example by looking for a flag or at a 1000 engine revolution counter (not shown) in the micro controller 52. If so, the methodology advances to block 254 and clears the 1,000 engine revolution flag and the 1,000 engine revolution counter. If not, the methodology advances to block 256 to increment the 1,000 engine revolution counter. The methodology advances to block 258 to add all cylinder unique or 200 misfire counters to the 1,000 misfire counter. The methodology advances to diamond 260 and the cylinder unique misfire counters are checked to see if their total is greater than or equal to that rate which could cause damage of the catalyst 24. If not, the methodology advances to diamond 162 previously described. If so, the methodology advances to block 262 and indicates failure of the misfire test. From block 262, the methodology advances to diamond 264 and checks to see if the last cylinder unique misfire counter has been tested, for example by looking for a flag or at a counter. If not, the methodology returns to diamond 260, previously described. If so, the methodology advances to block 268, to reset all cylinder unique misfire counters, the 200 engine revolution counter, and misfire flag registers, before returning to the methodology illustrated in FIG. 8A, beginning with diamond 162.

Figure 8C:
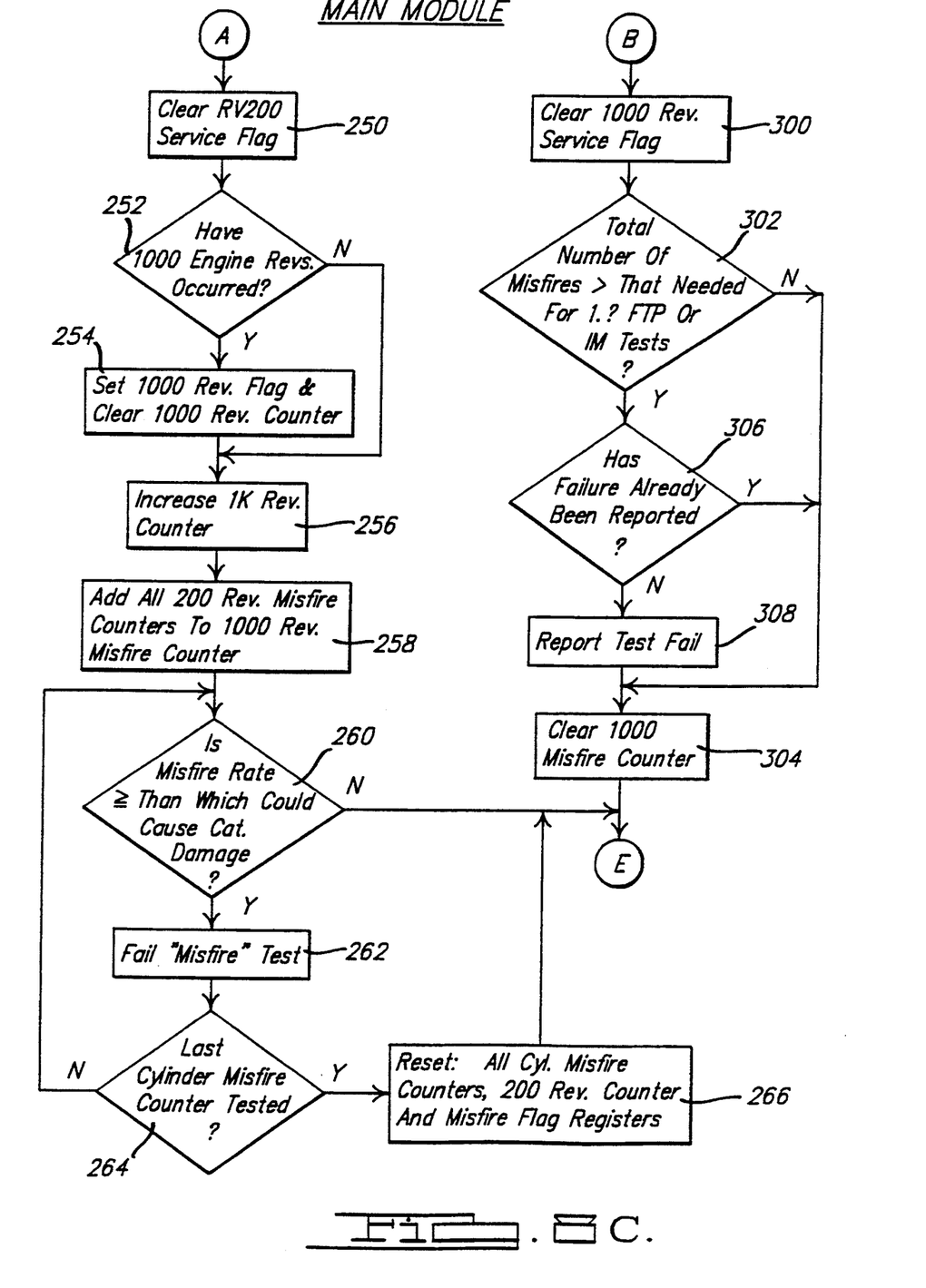

Referring now to block 3,000, the methodology clears the one thousand (1,000) engine revolution service flag before moving on to diamond 302 to determine whether the total number of misfires on the 1000 misfire counter is greater than a predetermined number of misfires needed for 1.5 FTP or IM Test. If not, the methodology branches to block 304 to clear the 1,000 misfire counter before returning to diamond 162 in FIG. 6A. If so, the methodology advances to diamond 306 and determines if a failure has already been reported, for example by looking for a flag. If so, the methodology advances to block 304 previously described. If a failure has not already been reported, the methodology advances to block 308, to report a test failure, before continuing to block 304, as previously described.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus to detect misfire in individual cylinders of an internal combustion engine in a motor vehicle, comprising:
   means for sensing rotation of a crankshaft;
   means connected to said sensing means for calculating a crankshaft velocity based on the sensed rotation of the crankshaft;
   means for adaptively compensating the calculated crankshaft velocity based on a predetermined cylinder by subtracting the calculated crankshaft velocity from a previous calculated crankshaft velocity and determining whether the compensated crankshaft velocity is within a predetermined crankshaft velocity range having an upper limit and a lower limit and counting a misfire if the compensated crankshaft velocity is within the upper limit and lower limit of the predetermined crankshaft velocity range.

2. An apparatus to detect misfire in individual cylinders of an internal combustion engine in a motor vehicle, comprising:
   means for sensing rotation of a crankshaft;
   means connected to said sensing means for calculating a crankshaft velocity based on the sensed rotation of the crankshaft;
   means for adaptively compensating the calculated crankshaft velocity based on a predetermined cylinder by subtracting the calculated crankshaft velocity from a previous calculated crankshaft velocity and determining whether the compensated crankshaft velocity is within a predetermined crankshaft velocity range having an upper limit and a lower limit and counting a misfire if the compensated crankshaft velocity is within the upper limit and lower limit of the predetermined crankshaft velocity range; and
   target means forming a plurality of trip points on the crankshaft for a predetermined interval of an expansion stroke.

3. An apparatus as set forth in claim 2 wherein said target means comprises a target connected to the crankshaft and having a plurality of teeth formed by slots as said trip points.

4. An apparatus to detect misfire in individual cylinders of an internal combustion engine in a motor vehicle, comprising:
   means for sensing rotation of a crankshaft;
   means connected to said sensing means for calculating a crankshaft velocity based on the sensed rotation of the crankshaft;
   means for adaptively compensating the calculated crankshaft velocity based on a predetermined cylinder by subtracting the calculated crankshaft velocity from a previous calculated crankshaft velocity and determining whether the compensated crankshaft velocity is within a predetermined crankshaft velocity range having an upper limit and lower limit and counting a misfire if the compensated crankshaft velocity is within the upper limit and lower limit of the predetermined range;
   a target connected to the crankshaft and having a plurality of teeth formed by slots as trip points on the crankshaft for a predetermined interval of an expansion stroke; and
   wherein said sensing means comprises a crankshaft sensor mounted at a fixed point in proximity with said target for sensing edges of said teeth.

5. An apparatus as set forth in claim 4 wherein said sensor is located at a top dead center position relative to a centerline of the crankshaft.

6. An apparatus as set forth in claim 5 wherein said means comprises an electronic control unit.

7. An apparatus to detect misfire in individual cylinders of an internal combustion engine in a motor vehicle, comprising:
   a single target connected to a crankshaft and having a plurality of teeth formed by slots to act as trip points;
   a single crankshaft sensor mounted at a fixed point in proximity with said single target for sensing edges of said teeth and rotation of the crankshaft;

means connected to said single crankshaft sensor for calculating a crankshaft velocity based on the sensed rotation of the crankshaft and subtracting the calculated crankshaft velocity from a previous calculated crankshaft velocity and determining whether the difference between the calculated crankshaft velocities is within a predetermined crankshaft velocity range having an upper limit and lower limit and counting a misfire if the difference between the calculated crankshaft velocities is within the upper limit and lower limit of the predetermined crankshaft velocity range.

8. An apparatus to detect misfire in individual cylinders of an internal combustion engine in a motor vehicle, comprising:
 a target connected to a crankshaft and having a plurality of teeth formed by slots to act as trip points;
 a crankshaft sensor mounted at a fixed point in proximity with said target for sensing edges of said teeth and rotation of the crankshaft;
 means connected to said sensor for calculating a crankshaft velocity based on the sensed rotation of the crankshaft and determining whether the calculated crankshaft velocity is within a predetermined velocity range and counting a misfire if the calculated crankshaft velocity is within the predetermined velocity range; and
 wherein said target is generally circular and said teeth are spaced circumferentially at a nine degree and sixty-nine degree interval for an expansion stroke.

9. An apparatus as set forth in claim 8 wherein said crankshaft sensor is mounted at top dead center relative to the crankshaft.

10. An apparatus to detect misfire in individual cylinders of an internal combustion engine in a motor vehicle, comprising;
 a single target connected to the crankshaft and having a plurality of teeth formed by slots to act as trip points;
 a single crankshaft sensor mounted at a fixed point in proximity with said single target for sensing edges of said teeth and rotation of the crankshaft, said single crankshaft sensor being mounted at top dead center relative to the crankshaft;
 means connected to said single crankshaft sensor for calculating a crankshaft velocity based on the sensed rotation of the crankshaft and subtracting the calculated crankshaft velocity from a previous calculated crankshaft velocity and determining whether the difference between the calculated crankshaft velocities is within a predetermined crankshaft velocity range having an upper limit and lower limit and counting a misfire if the difference between the calculated crankshaft velocities is within the upper limit and lower limit of the predetermined crankshaft velocity range.

11. A method of detecting misfire in individual cylinders of an internal combustion engine in a motor vehicle, said method comprising the steps of:
 sensing rotation of a crankshaft;
 calculating a crankshaft velocity based on the sensed rotation of the crankshaft;
 adaptively compensating the calculated crankshaft velocity based on a predetermined cylinder by subtracting the calculated crankshaft velocity from a previous calculated crankshaft velocity;
 comparing the compensated crankshaft velocity to a predetermined crankshaft velocity range having an upper limit and lower limit to determine if therein; and
 counting a misfire if the compensated crankshaft velocity is within the upper limit and lower limit of the predetermined crankshaft velocity range.

12. A method as set forth in claim 11 wherein said step of sensing comprises starting a timer when a crankshaft sensor detects a beginning of a predetermined interval of an expansion stroke and stopping the timer when the crankshaft sensor detects an end of the predetermined interval.

13. A method as set forth in claim 11 including the step of locating the crankshaft sensor at a top dead center position relative to the crankshaft.

14. A method as set forth in claim 11 including the step of forming a target on the crankshaft with teeth spaced circumferentially to form the predetermined interval.

15. A method of detecting misfire in individual cylinders of an internal combustion engine in a motor vehicle, said method comprising the steps of:
 forming a target on a crankshaft with teeth spaced circumferentially to form a predetermined interval;
 sensing rotation of the crankshaft;
 starting a timer when the crankshaft sensor detects a sixty-nine degree edge of a tooth on the target;
 stopping the timer when the crankshaft sensor detects a nine degree edge of a tooth on the target;
 calculating a crankshaft velocity based on the sensed rotation of the crankshaft and the time elapsed on the timer;
 compensating the calculated crankshaft velocity based on a predetermined cylinder by subtracting the calculated crankshaft velocity from a previous calculated crankshaft velocity;
 comparing the compensated crankshaft velocity to a predetermined crankshaft velocity range having an upper limit and a lower limit to determine if therein; and
 counting a misfire if the compensated crankshaft velocity is within the upper limit and lower limit of the predetermined crankshaft velocity range.

16. A method of detecting misfire in individual cylinders of an internal combustion engine in a motor vehicle, said method comprising the steps of:
 forming a target on a crankshaft with teeth spaced circumferentially to form a predetermined interval;
 sensing rotation of the crankshaft;
 starting a timer when a crankshaft sensor detects a sixty-nine degree edge of a tooth on the target;
 stopping the timer when the crankshaft sensor detects a nine degree edge of a tooth on the target;
 calculating a crankshaft velocity based on the sixty degree difference between edges of the teeth and the time elapsed on the timer;
 compensating the calculated crankshaft velocity based on a predetermined cylinder by subtracting the calculated crankshaft velocity from a previous calculated crankshaft velocity;
 comparing the compensated. crankshaft velocity to a predetermined crankshaft velocity range having an upper limit and a lower limit to determine if therein; and
 counting a misfire if the compensated crankshaft velocity is within the upper limit and lower limit of the predetermined crankshaft velocity range.

17. A method of detecting misfire in individual cylinders of an internal combustion engine in a motor vehicle, said method comprising the steps of:

forming a target on a crankshaft with teeth spaced circumferentially about every sixty degrees;

locating a crankshaft sensor at a top dead center position relative to the crankshaft;

sensing rotation of a crankshaft by starting a timer when the crankshaft sensor detects an edge of a tooth and stopping the timer when the crankshaft sensor detects an edge of another tooth for the sixty degree interval;

calculating a crankshaft velocity based on the sixty degree difference between the edges of the teeth and the time elapsed on the timer;

compensating the calculated crankshaft velocity by subtracting the calculated crankshaft velocity from a previous calculated crankshaft velocity;

comparing the compensated crankshaft velocity to a predetermined crankshaft velocity range having an upper limit and a lower limit to determine if therein and counting a misfire if the compensated crankshaft velocity is within the upper limit and lower limit of the predetermined crankshaft velocity range.

* * * * *